Figures 1, 2, 3, 4:
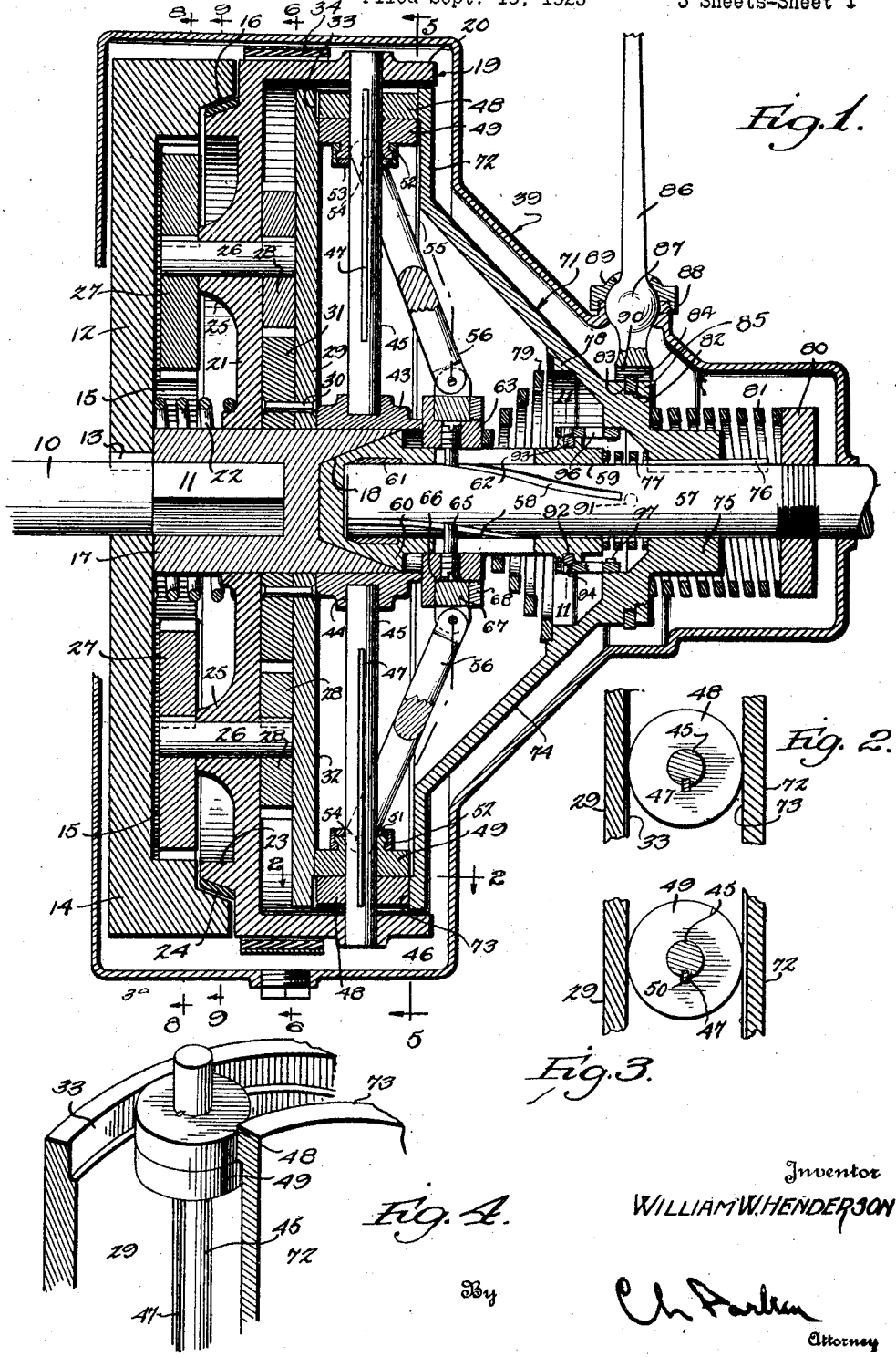

Sept. 6, 1927.

W. W. HENDERSON

POWER TRANSMISSION

Filed Sept. 19, 1925

1,641,428

3 Sheets-Sheet 1

Inventor
WILLIAM W. HENDERSON

By

Attorney

Sept. 6, 1927.  W. W. HENDERSON  1,641,428
POWER TRANSMISSION
Filed Sept. 19, 1925   3 Sheets-Sheet 2

Inventor
WILLIAM W. HENDERSON
Attorney

Sept. 6, 1927. 1,641,428
W. W. HENDERSON
POWER TRANSMISSION
Filed Sept. 19, 1925  3 Sheets-Sheet 3

Inventor
WILLIAM W. HENDERSON
By
Attorney

Patented Sept. 6, 1927.

1,641,428

UNITED STATES PATENT OFFICE.

WILLIAM W. HENDERSON, OF BATH, NEW YORK.

POWER TRANSMISSION.

Application filed September 19, 1925. Serial No. 57,453.

This invention relates to power transmissions and more particularly to a transmission particularly adapted for use in connection with automobiles.

An important object of the invention is to provide means for automatically reducing the driving ratio when the resistance to the movement of the vehicle increases, as when traveling under heavy loads, ascending hills, etc.

A further object is to provide a device of the above mentioned character wherein a friction drive is employed including rollers adapted to contact with a rotatable plate, means being employed for automatically shifting the rollers toward or away from the center of the plate to vary the driving ratio according to driving conditions.

A still further object is to provide a transmission of the character just mentioned wherein rotation of the plate is accomplished through a train of gears, means being provided for directly connecting the engine shaft to the propeller shaft under average driving conditions when there is no unusual driving strain present on the driving wheels of the vehicle.

Other objects and advantages of the invention will become apparent during the course of the following description.

Figure 5:
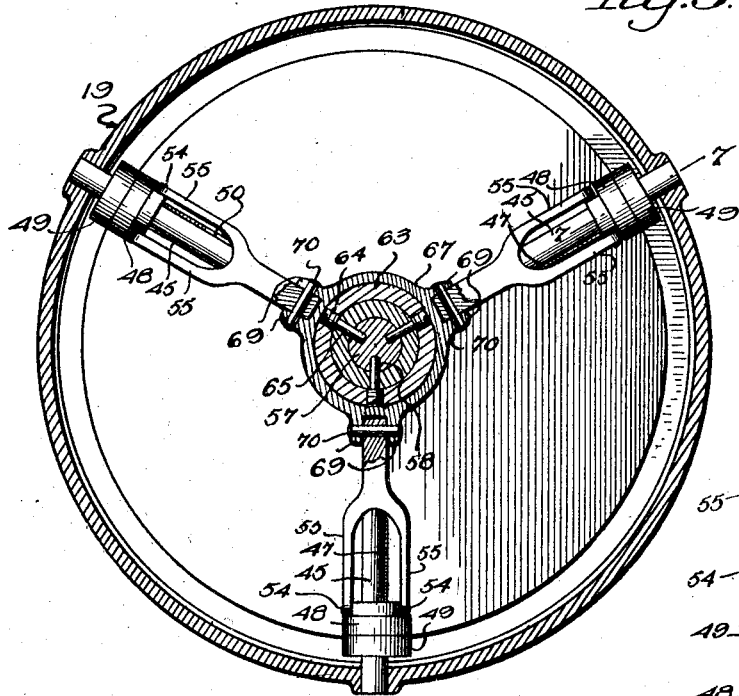
Figure 7:
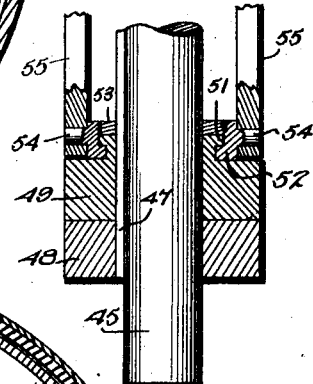
Figure 6:
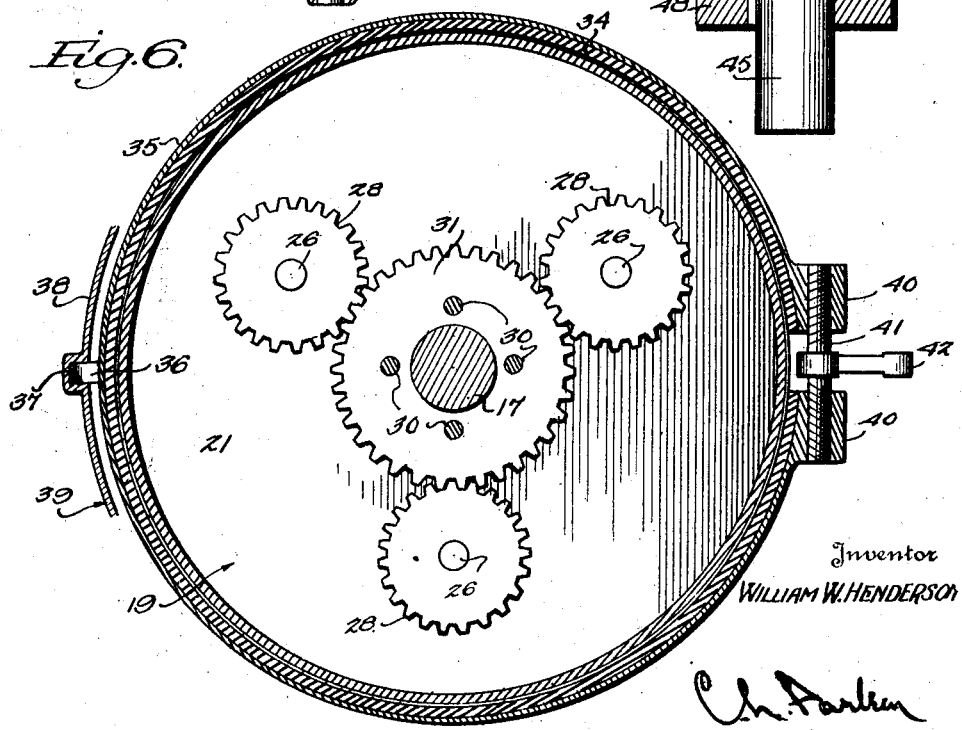
Figure 8:
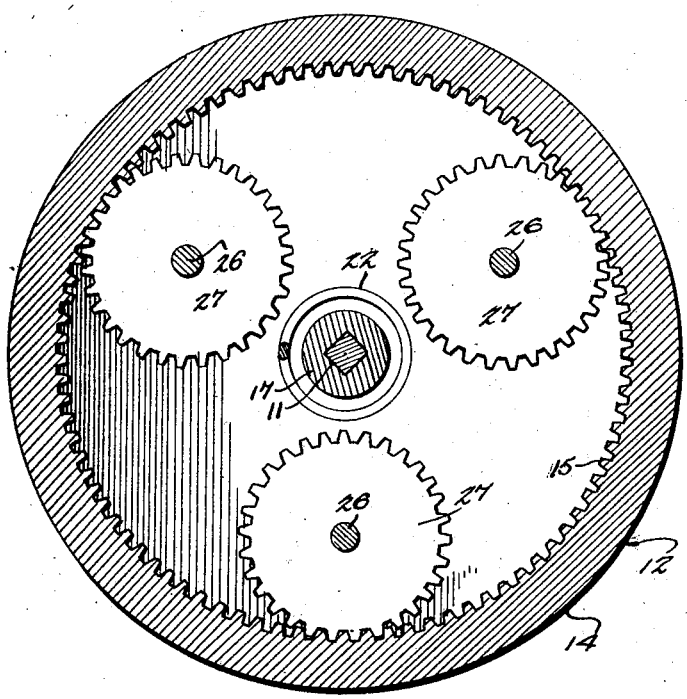
Figure 10:
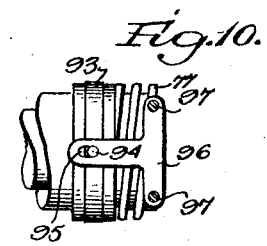
Figure 11:
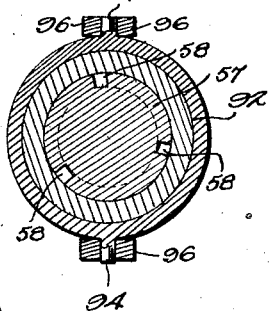
Figure 9:
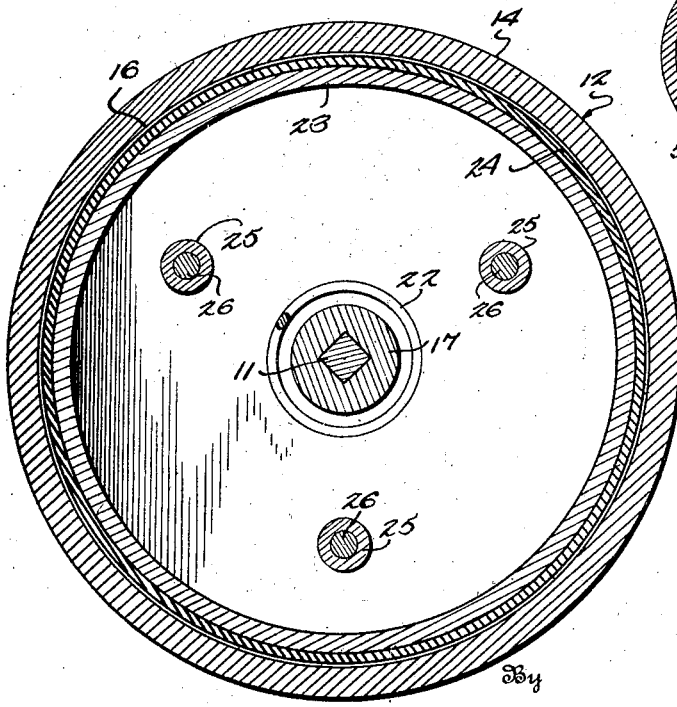

In the drawings I have shown one embodiment of the invention. In this showing:

Figure 1 is a central vertical longitudinal sectional view through the transmission, Figure 2 is a section on line 2—2 of Figure 1, showing one of the outer driving rollers, Figure 3 is a similar view on the same section line looking in the opposite direction, showing one of the inner driving rollers, Figure 4 is a fragmentary perspective showing the driving rollers and associated elements, Figure 5 is a section on line 5—5 of Figure 1, the transmission casing being removed, Figure 6 is a section on line 6—6 of Figure 1, Figure 7 is a detail sectional view on line 7—7 of Figure 5, the drum being omitted, Figure 8 is a section on line 8—8 of Figure 1, Figure 9 is a similar view on line 9—9 of Figure 1, Figure 10 is a detail view of the friction roller retracting means, and, Figure 11 is a detail sectional view on line 11—11 of Figure 1.

Referring to the drawings the numeral 10 designates the rear portion of the crank shaft of an automobile engine having a squared rear end 11 as shown in Figure 1. A fly wheel 12 is keyed to the crank shaft as at 13 to rotate therewith. The fly wheel is provided with a relatively heavy flange 14 to give it the necessary weight and this flange is provided internally with a ring gear 15 as shown in detail in Figure 8. The flange 14 is further provided outwardly of the gear 15 with a machined conical clutch surface 16 for a purpose to be described. Rearwardly of the fly wheel a friction sleeve 17 is arranged on the squared end of the crank shaft to be driven thereby as will be apparent, and the member 17 is provided in its rear end with a conical friction recess 18 for a purpose to be described.

A rotating element designated as a whole by the numeral 19 surrounds the hollow sleeve 17, as shown in Figure 1, and is free to rotate thereon. The rotating member is preferably in the form of a drum having a substantially cylindrical peripheral flange 20 and a circular forward wall 21. A spring 22 is arranged between the fly wheel and the wall 21 to normally project the drum 20 rearwardly for a purpose to be described. The drum is provided on its forward face with a peripheral flange 23 having a conical outer face to which is secured a similarly shaped clutch ring 24 preferably formed of brass. The taper of the clutch ring 24 corresponds to that of the face 16 and is adapted to engage thereagainst under conditions to be described.

The drum 20 is provided at spaced points with bosses 25 forming bearings having openings arranged parallel to the axis of the shaft 10. A shaft 26 is arranged to rotate in each of the bosses 25 and each shaft is provided at its forward end with a gear 27 meshing with the gear 15 as clearly shown in Figure 8.

Rearwardly of the wall 21, each of the shafts 26 is provided with a pinion 28 and the gears and pinions referred to may be secured to the shafts 26 by suitable keys as shown.

Rearwardly of the wall 21 a substantially circular plate 29 surrounds the collar 17 and is riveted or otherwise secured, as at 30, to a central gear 31 arranged co-axial with the shaft 10. The gear 31 meshes with each of the pinions 28 as shown in detail in Figure 6. The plate 29 is provided with a smooth machined rear face 32 and is further provided outwardly of the face 32 with a recess 33 arranged slightly depressed from the face 32 for a purpose to be described. It will be apparent that the plate 29 and gear 31 are adapted to freely rotate upon the collar 17 and, under certain conditions, are adapted to partake of a slight sliding movement carrying with them the drum 19 against the tension of the spring 22. The forward faces of the gears 27 are slightly spaced from the inner face of the fly wheel to permit the drum to partake of this sliding action.

Under certain conditions it is desirable to fix the drum 19 against rotation and accordingly I provide a brake band 34 adapted to be brought into engagement with the outer periphery of the flange 20. As shown in Figure 6, the band 34 is surrounded by a metal clamping band 35 having a lug 36 arranged centrally thereof and disposed in a recess 37 formed in the cylindrical portion 38 of a transmission casing 39. It will be obvious that the rotation of the band 35 is prevented by engagement of the lug 36 in the recess 37. The free ends of the band 35 are provided with lugs 40 having oppositely threaded alined internal openings to receive a turnbuckle 41 threaded to correspond to the openings as will be apparent. An arm 42 is secured to the central portion of the turnbuckle to effect rotation thereof when it is desired to clamp the brake band 34 against the drum to prevent rotation thereof.

A sleeve 43 surrounds the rear end of the collar 17 in rotating and sliding engagement therewith, and the forward end of the sleeve 43 contacts with the rear face of the plate 29, as shown in Figure 1. The sleeve 43 is provided with radial bearing openings 44 adapted to rotatably receive the inner ends of radial shafts 45. The outer ends of these shafts are journalled in radial openings 46 formed in the flange 20 of the drum 19. A key 47 is secured to each of the shafts 45 and driving wheels 48 are secured to the shafts 45 adjacent their outer ends by means of the keys 47. The wheels 48 are adapted to rotate positively with the shafts 45 and are not adapted to slide longitudinally thereon. Inner driving wheels 49 are also arranged on the shafts 45 as clearly shown, and these wheels are provided with slots 50 slidably receiving the keys 47 whereby the wheels 49 are adapted to move forwardly and outwardly along the shafts 45. As shown in detail in Figure 7, each of the wheels 49 is provided with an inwardly extending shoulder 51 and a rotatable sleeve 52 surrounds each of the shoulders 51. A threaded plug 53 is arranged in the end of each sleeve 52 to maintain it in proper position, as will be apparent. The sleeves 52 are provided on opposite sides with trunnions 54 arranged in openings formed in the arms 55 of fork members 56.

A propeller shaft 57 is arranged rearwardly of the shaft 10 is axial alinement therewith, as clearly shown in Figure 1. The shaft 57 is provided with spiral slots 58 for a purpose to be described. A friction sleeve 59 surrounds the forward end of the shaft 57 and is provided at its forward end with a conical head 60 frictionally engaging within the conical opening 18 of the collar 17. The sleeve 59 may be provided near its forward end with a bronze or similar bearing 61 rotatably receiving the shaft 57. The friction sleeve 59 is adapted to partake of slight rotating movement with respect to the shaft 57 in a manner to be described. The sleeve 59 is provided intermediate its ends with longitudinal slots 62 corresponding in number to the spiral slots 58 of the propeller shaft.

As shown in Figures 1 and 5, a collar 63 surrounds the sleeve 59 and is adapted to slide longitudinally thereon. The collar 63 is provided with threaded openings receiving the threaded portions 64 of radial pins the inner ends 65 of which extend through the slots 62 and into the slots 58 of the propeller shaft. The collar 63 is further provided with a circumferential groove 66 rotatably receiving a ring 67, and a threaded ring 68 engages the rearward end of the collar 63 to maintain the ring 67 in proper position. The ring 67 is provided with pairs of ears 69 receiving pivot pins 70, as shown in Figure 5 and the inner ends of the fork members 56 are pivotally connected with the pins 70. As shown in Figure 1 the sleeve 43 extends rearwardly beyond the conical head 60 and contacts with the forward face of the collar 63.

Referring to Figure 1, the numeral 71 designates as a whole a friction driving plate having a radial flange 72 at its outer end. The radial portion of the driving plate is provided with a forwardly extending face 73 adapted to frictionally engage the outer driving wheels 48, as clearly shown. The driving plate 71 is provided with an intermediate tapered portion 74 and terminates at its rear end in a collar 75 splined as at 76 to the propeller shaft 57 to rotate therewith. A spring 77 surrounds the shaft 57 between the collar 75 and the friction sleeve 59 to urge the latter forwardly to maintain a frictional contact between the head 60 and the conical opening 18. The tapered portion 74 of the driving plate is provided with an internal shoulder 78 and a convolute helical spring 79 is arranged with its larger end against the shoulder 78 and its smaller forward end against the collar 63 to normally urge the latter forwardly against the rear end of the sleeve 43.

Means are provided for urging the driving plate 71 forwardly whereby the face 73 will be maintained in firm contact with each of the rollers 48. As shown, a collar 80 is secured to the shaft 57 rearwardly of the collar 75 and a heavy spring 81 contacts at its rear end with this collar. The driving plate 71 is provided forwardly of the collar 75 with a substantially cylindrical enlargement 82 and the forward end of the spring 81 bears against the rear face of the cylindrical portion 82 whereby it will be apparent that the driving plate 71 is normally urged forwardly. When the apparatus is in neutral position, it is desired to release the driving plate from engagement with the rollers 48, and means are provided for obtaining this result. The cylindrical portion 82 of the driving plate is provided with a circumferential groove 83 in which is rotatably arranged a ring 84 and a threaded ring 85 maintains the ring 84 in proper position. An operating lever 86 is adapted to move the driving plate 71 rearwardly. As shown, the lever 86 is provided with a ball 87 arranged in a socket 88 preferably formed integral with the transmission cover 39. A cap 89 is secured to the socket 88 as shown. The lever 86 is provided at its lower end with forked arms 90 having openings in their ends to receive trunnions 91 carried by the ring 84. It will be apparent that forward movement of the upper end of the lever 86 will withdraw the driving plate from contact with the wheels 48.

With the apparatus in neutral position, it is desirable to release the conical head 60 from contact with the conical opening 18 to release the motor from a frictional drive when the motor is to be started, and when the engine is running idle. Means are provided accordingly for moving the friction sleeve 59 rearwardly when the driving plate 71 is retracted. Referring to Figures 1, 10 and 11, it will be seen that the sleeve 59 is provided near its rear end with a circumferential groove 92 in which is rotatably mounted a ring 93 provided on opposite sides with trunnions 94. The trunnions 94 are adapted to be received in slightly elongated openings 95 formed in the forward ends of substantially T-shaped operating members 96. Screws or similar fastening elements 97 are adapted to secure the rear end of the member 96 within the interior of the driving plate 71.

The operation of the device is as follows:
When it is desired to start the engine of the vehicle the upper end of the lever 86 is moved forwardly to retract the friction plate 71 against the tension of the spring 81. Initial movement of the lever immediately moves the plate 71 rearwardly and after the lever has moved a slight distance the forward ends of the slots 95 engage against the pin 94 to retract the friction sleeve 59 to disengage the conical head 60 from the recess 18. Since the retraction of the plate 71 disengages it from the friction rollers 48, it will be obvious that the crank shaft of the engine is free to rotate to permit the engine to be started. It will be apparent that any of the usual holding means may be employed for retaining the lever 86 in neutral position. When the vehicle is to be started in motion the arm 42 is moved to clamp the brake band 34 about the drum 19 to hold the latter stationary. The lever 86 is then moved rearwardly slowly until the conical head 60 frictionally engages within the recess 18 and this action tends to rotate the friction sleeve 59 in the same direction as the crank shaft 10. As the apparatus is illustrated the shaft 10 is adapted to rotate in a counter-clockwise direction as viewed from the rear end, and initial engagement of the conical head 60 within the recess 18 tends to rotate the friction sleeve 59 in a counter-clockwise direction, thus causing the pins 65 to move rearwardly along the spiral slots 58. This action draws the inner ends of the forked arms 56 rearwardly, thus moving the rollers 49 inwardly, as will be apparent. The frictional engagement between the conical head 60 and recess 18 tends to start rotation of the transmission shaft 57, the head 60 and recess 18 acting as an ordinary clutch. Further movement rearwardly of the lever 86 then permits the engaging face 73 to contact with the outer rollers 48. It will be apparent that when the brake band 34 is gripped about the drum 19, rotation of the latter is prevented and consequently the gear 15 will rotate the gears 27 about the axes of the shafts 26. The shafts 28 thus will be rotated and since these shafts mesh with the gears 31 the latter, together with the plate 29, will be rotated about the collar 17. Rotation of the plate 29 causes rotation of the inner driving wheels 49 due to the frictional contact between these members and rotation accordingly is imparted to the radial shafts 45. With the wheels 49 arranged toward the center of the apparatus, it will be apparent that the wheels will be rotated relatively slowly and since the wheels 48 are rotated at the same speed as the wheels 49 and contact with the friction plate 71 near the periphery thereof, the plate 71 will be rotated at a slower speed than the plate 29.

While the shaft 57 will be rotated by the plate 71 in the same direction as the shaft 10, there is a tendency for the shaft 57 to create a drag due to the torque present at the rear wheels when the vehicle is initially started. Thus there will be a tendency for the shaft 57 to partake of clockwise rotation as viewed from the rear end of the shaft, with respect to the shaft 10 although actually both shafts are rotating in the same direction. The drag on the shaft 57 tends to move the pins 65 toward the rear ends of the slots 58 thus retaining the rollers 49 at inner or low speed positions against the plate 29. The spring 79 constantly exerts a forward pressure against the sleeve 63, thus tending to move the pins 65 toward the forward ends of the slots 58. As the momentum of the vehicle increases, the tendency of the shaft 57 to rotate in a clockwise direction with respect to the shaft 10 decreases and thus the spring 79 will gradually force the sleeve 63 forwardly. This action gradually moves the driving wheels 49 outwardly radially of the shaft 57, thus increasing the speed ratio as will be apparent. When the driving wheels 49 reach the position shown in Figure 1 of the drawings, it will be apparent that the friction plates 29 and 71 will rotate at nearly the same speed the rotation of the plate 71 being slightly slower than that of the plate 29 due to the fact that the rollers 49 are arranged a slight distance inwardly of the rollers 48. As soon as the wheels 48 reach the position shown in Figure 1, or a position approximating that shown in Figure 1, the operator of the vehicle may release the brake band 34 to permit free rotation of the drum 19. The tension of the spring 79 which urges the sleeve 63 forwardly is materially greater than the tension of the forward spring 22 which urges the drum 19 rearwardly. Thus when the brake band 34 is released, the spring 79 will urge the sleeve 63 forwardly, and this action also moves the collar 43 forwardly as will be apparent. Since the members 43 and 63 move forwardly as a unit, there will be no further tendency of the wheels 49 to move outwardly and they will remain in the position shown in Figure 1. The forward end of the collar 43 contacts with the rear face of the friction plate 29 and it will be obvious that the latter will be moved forwardly together with the drum 19 until the clutch band 24 engages the conical face 16. When this position is reached it will be apparent that the drum 19 will be positively driven with the fly wheel 22 and there will be no rotation of the shafts 26 about their axes and consequently the shafts 45 will be held against rotation about their axes. Rotation of the drum 19 will cause rotation of the shafts 45 about the axis of the shafts 10 and 57 and the frictional engagement between the wheels 48 and friction plate 71 will cause the latter to be positively driven. Thus it will be seen that the shaft 57 will be positively driven with the shaft 10 when travelling in high speed under ordinary driving conditions as on a fairly level road. The apparatus is adaped to be used in connection with any suitable form of reducing gearing (not shown) connected between the shaft 57 and the differential of the vehicle. The reducing gearing also preferably includes any suitable type of reversing gearing (not shown) as will be apparent. If the vehicle starts to ascend a hill, thus materially increasing the torque on the rear wheels, there will be a tendency of the shaft 57 again to drag with respect to the shaft 10. This action causes a slight relative counter movement of the shaft 57 with respect to the shaft 10 and a slight slippage will be created between the wheels 48 and the friction plate 71. The counter movement of the shaft 57 is frictionally opposed by engagement of the head 60 within the recess 18, thus causing relative movement between the shaft 57 and friction sleeve 59, and this action causes the pins 65 to move rearwardly along the spiral slots 58. Thus the sleeve 63 will be retracted slightly and tension of the spring 79 will be relieved from the collar 43 and the tension of the spring 22 will immediately disengage the friction band 24 from the conical face 16. When this action occurs, the drive to the shaft 57 will cease to be delivered from the fly wheel 14 and friction plate 71, and will be accomplished mostly through rotation of the gears 27 and 28. Rotation of these gears obviously will rotate the shafts 45 about their own axes, thus rotating the wheels 48 to deliver power to the friction plate 71 to rotate the shaft 57. Rearward movement of the sliding sleeve 63 causes the wheels 49 to be drawn inwardly depending upon the amount of drag from the shaft 57. The wheels 49 will continue to move inwardly until a low gear ratio is reached which is sufficient to balance the increased torque on the rear wheels of the vehicle whereupon the spring 79 will stop further rearward movement of the sleeve 63. As soon as the vehicle reaches the top of the hill and the torque on the rear wheels is decreased, it will be apparent that the spring 79 again will force the sleeve 63 forwardly to increase the speed ratio. As soon as the wheels 49 reach the position shown in Figure 1 any additional tendency of the sleeve 63 to move forwardly will again cause engagement between the clutch band 24 and the conical face 16.

While I have described the power as being delivered to the shaft 57 through rotation of the gears 27, shafts 28, shafts 45 and wheel 48 when additional torque is present on the rear wheels, as when ascending a hill, it will be apparent that with the brake band 34 disengaged, some of the rotation will be delivered by rotation of the drum 19 about its axis. Obviously rotation of the gears 27 and the elements connected thereto creates a torque on the drum 19 which tends to rotate it and thus part of the power will be delivered by rotation of the wheels 48 against the friction plate 71 and part of the power will be delivered by rotation of the drum 19 due to its tendency to rotate when the brake band 34 is released. The brake band 34 is employed only when starting the vehicle to create an immediate tendency of the sleeve 63 to move rearwardly to cause the wheels 49 to assume low speed position. After the vehicle has reached a high speed position, the brake band 34 may be released as previously described and the subsequent normal operation of the transmission will be entirely automatic.

It is to be understood that the form of my invention herewith shown and described is to be taken as a preferred example of the same and that various changes in the shape, size and arrangement of parts may be resorted to without departing from the spirit of the invention or the scope of the subjoined claims.

I claim:

1. A transmission comprising a drive shaft and a driven shaft, a rotatable friction member adapted to be driven by said drive shaft, a rotatable friction element connected to said driven shaft to rotate therewith, said member and said element having adjacent friction faces arranged substantially at right angles to the axis of said drive shaft, a rotatable shaft arranged between the adjacent faces of said member and said element substantially at right angles to said drive shaft, a wheel secured to said rotatable shaft and frictionally engaging the friction face of said element, a second wheel surrounding said rotatable shaft to rotate therewith and mounted to slide thereon, automatic means for sliding said second wheel on said rotatable shaft toward and away from the center of said friction element according to the torque on said driven shaft, and means for connecting said friction element to said drive shaft to be rotated therewith.

2. A device constructed in accordance with claim 1 provided with means for controlling said last named means.

3. A transmission comprising a drive shaft and a driven shaft, friction plates connected to said shafts and provided with spaced parallel friction faces arranged substantially at right angles to the axis of said drive shaft, a radial shaft arranged between said friction faces, a wheel secured to said radial shaft near its outer end and contacting with the friction face of one of said plates, a second wheel rotatable with said radial shaft and slidable thereon toward and away from the center of the other of said plates and contacting with the friction face thereof, means for progressively moving said last named wheel toward the center of its plate as the torque on said driven plate increases, said means including an arm connected at its upper end to said second named wheel and a collar slidable longitudinally with respect to said driven shaft, the inner end of said arm being pivotally connected to said collar, and resilient means opposing movement of said second named wheel toward the center of its plate.

4. A transmission comprising a drive shaft and a driven shaft, a friction plate having a friction face arranged substantially at right angles to the axis of said drive shaft, planetary gearing connected between said drive shaft and said plate, a second friction plate connected to said driven shaft to rotate therewith and provided with a friction face arranged parallel to the friction face of the other of said plates, a radial shaft arranged between said friction faces, a wheel secured to said radial shaft near its outer end and contacting with the friction face of said last named plate, a second wheel slidable on said radial shaft and adapted to rotate therewith, said second named wheel being arranged inwardly of said first named wheel and contacting with the friction face of said first named plate, a longitudinally slidable collar arranged coaxial with said driven shaft adjacent the inner end of said radial shaft, an arm connected between said collar and said second named wheel to draw the latter inwardly as said collar moves away from said radial shaft, resilient means opposing movement of said collar away from said radial shaft, and means for moving said collar away from said radial shaft as the torque on said driven shaft increases.

5. A device constructed in accordance with claim 4 wherein said last named means includes friction contact means between said drive shaft and said driven shaft tending to prevent relative rotation thereof, said driven shaft being provided with a spiral slot, and a pin carried by said collar and having an end arranged in said slot.

6. A device constructed in accordance with claim 4 wherein said last named means includes friction contact means between said drive shaft and said driven shaft tending to prevent relative rotation thereof, said driven shaft being provided with a spiral slot, and a pin carried by said collar and having an end arranged in said slot, and means for disengaging said last named plate from its corresponding wheel and for disengaging the friction contact means between said drive shaft and said driven shaft.

7. A transmission comprising a drive shaft, a fly wheel carried by said shaft and provided with a clutch face, a ring gear carried by said fly wheel, a drum rotatable with respect to said drive shaft and surrounding the end thereof, a plurality of shafts rotatably carried by said drum parallel to said drive shaft, a gear carried by each of said plurality of shafts and meshing with said ring gear, a pinion carried by each of said last named shafts, a friction plate rotatably surrounding the axis of said drive shaft, a gear carried by said plate and meshing with said pinions, a driven shaft, a second friction plate slidably mounted on said driven shaft to rotate therewith, resilient means for projecting said second friction plate toward the first friction plate, a plurality of radial shafts arranged between said friction plates, a wheel secured to each of said radial shafts near its outer end and contacting with said second named friction plate, a second wheel mounted on each of said radial shafts inwardly of said first named wheels, said second named wheels being adapted to rotate with said radial shafts in contact with said first named friction plate and slidable along said radial shafts, a sleeve surrounding the end of said driven shaft and having frictional contact with said drive shaft tending to oppose relative rotating movement of said drive shaft and said driven shaft, said sleeve being provided with a longitudinal slot, a collar surrounding said sleeve, an inwardly projecting radial pin carried by said collar and extending through said slot, said driven shaft being provided with a spiral slot receiving the inner end of said pin, a plurality of arms connected at their inner ends to said collar and at their outer ends to said second named wheels, said collar being slidable away from said radial shafts to draw said second named wheels inwardly, a spring normally urging said collar toward said radial shafts to move said second named wheels outwardly, a clutch member carried by said drum adjacent the clutch face on said fly wheel, said spring being adapted to cause engagement between said clutch member and said clutch face when said second named wheels have moved to outer positions, and means for disengaging said second named friction plate from its corresponding wheels and for disengaging the frictional contact between said sleeve and said drive shaft.

8. A device constructed in accordance with claim 7 provided with a spring normally tending to disengage said clutch member from said clutch face, said spring being of a tension less than that of said first named spring, and manually controlled means for preventing rotation of said drum.

9. A transmission comprising a drive shaft and a driven shaft, constantly engaged variable ratio friction drive means between said shafts, means for varying the ratio of said drive means according to the torque on said driven shaft, and means for positively locking said driven shaft with said drive shaft to rotate therewith.

10. A transmission comprising a drive shaft and a driven shaft, variable ratio drive means between said shafts including a rotatable friction plate and a rotatable wheel engaging thereagainst, means for automatically varying the ratio of said drive means according to the torque on said driven shaft by moving said wheel toward and away from the center of said plate, and means for positively locking said driven shaft with said drive shaft to rotate therewith.

11. A transmission comprising a drive shaft and a driven shaft, variable ratio drive means between said shafts including a rotatable friction plate and a rotatable wheel engaging against and movable toward and away from the center of said plate, means tending to normally urge said wheel outwardly from the center of said plate, means adapted to oppose said last named means to move said wheel inwardly to progressively reduce the speed ratio between said shafts as the torque on said driven shaft increases, and means for positively locking said driven shaft with said drive shaft to rotate therewith.

12. A transmission comprising a drive shaft and a driven shaft, variable ratio drive means between said shafts including a rotatable friction plate, a rotatable wheel engaging against and movable toward and away from the center of the plate, and means for transmitting power from said wheel to said driven shaft, means tending to normally urge said wheel outwardly from the center of said plate, means adapted to oppose said last named means to move said wheel inwardly to progressively reduce the speed ratio between said shafts as the torque on said driven shaft increases, and means for positively locking said driven shaft with said drive shaft to rotate therewith.

13. A transmission comprising a drive shaft and a driven shaft, a friction member adapted to be driven by said drive shaft, a friction element connected to said driven shaft to rotate therewith, friction drive means connected between said member and said element, automatic means for changing the position of a portion of said friction drive means to vary the speed ratio between said member and said element according to the torque on said driven shaft, and means for positively locking said driven shaft with said drive shaft to rotate therewith.

14. A transmission comprising a drive shaft and a driven shaft, variable ratio friction drive means including a plurality of rotatable members having constantly engaged friction faces, torque responsive means for varying the speed ratio between said shafts, and means for locking said shafts and said friction drive means together to rotate as a unit.

In testimony whereof I affix my signature.

WILLIAM W. HENDERSON.